C. G. SHEPARD & P. ADAMS, Jr.
Cooking Utensil.

No. 200,575. Patented Feb. 19, 1878.

Witnesses:
Chas. J. Buchheit
Geo. H. Sykes

Inventors:
Chas. G. Shepard
Peter Adams Jr.
By Wilhelm & Bonner
Attorneys

N. PETERS, PHOTO-LITHOGRAPHER, WASHINGTON, D C.

UNITED STATES PATENT OFFICE.

CHARLES G. SHEPARD AND PETER ADAMS, JR., OF BUFFALO, NEW YORK.

IMPROVEMENT IN COOKING UTENSILS.

Specification forming part of Letters Patent No. 200,575, dated February 19, 1878; application filed December 27, 1877.

*To all whom it may concern:*

Be it known that we, CHARLES G. SHEPARD and PETER ADAMS, Jr., both of the city of Buffalo, in the county of Erie and State of New York, have invented a new and useful Improvement in Cooking Utensils, of which the following is a specification, reference being had to the accompanying drawings.

Our invention relates to a cooking utensil in which the articles are cooked by steaming; and it consists in combining, with a pan or spider of suitable construction, a removable griddle or pan supported in the upper part of the spider, and a removable cover, so that the articles placed upon the griddle or pan are subjected to the action of the steam emitted by the boiling water contained in the spider without being brought in contact with the water.

Figure 1:
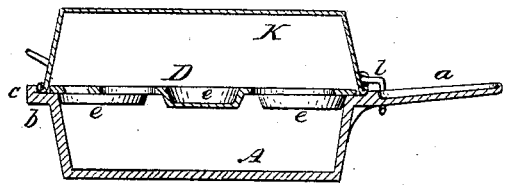
Figure 2:
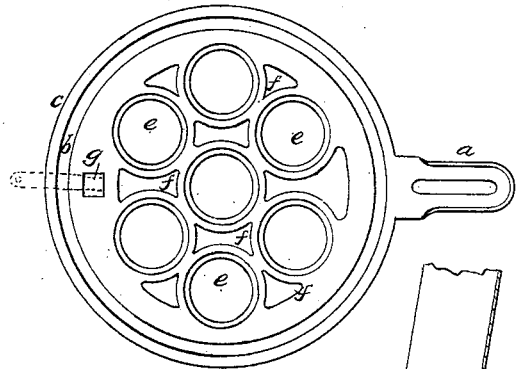
Figure 3:
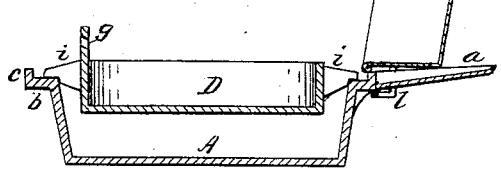
Figure 4:
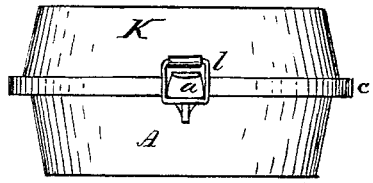

In the accompanying drawings, Figure 1 is a sectional elevation of our improved utensil provided with a pan having a series of cups for steaming eggs. Fig. 2 is a plan view thereof with the cover removed. Fig. 3 is a sectional elevation of the utensil, showing a modified form of the pan. Fig. 4 is a rear elevation of the utensil.

Like letters of reference designate like parts in each of the figures.

A represents a pan or spider; $a$, the handle thereof, and $b$ a horizontal flange formed around the upper edge of the pan, and constructed with a vertical offset or shoulder, $c$.

D represents a flat pan or griddle resting upon the flange $b$ of the spider A. As shown in Figs. 1 and 2, the pan D is composed of a series of cups, $e$, connected together so as to leave intermediate spaces $f$ for the passage of the steam, and cast in one piece with a surrounding annular plate, by which the pan is supported upon the flange $b$ of the spider, the pan D being held against lateral displacement by the cups $e$ bearing against the side of the pan or spider A.

The pan D, formed with the cups $e$, is designed for the purpose of steaming eggs, each cup being made of the proper size to receive an egg.

$g$ is an opening formed in the pan D, for inserting therein an ordinary stove-lid lifter when it is desired to remove the pan from the spider A. If preferred, the pan D may be provided with a staple near the center, for the same purpose.

For the purpose of steaming oysters, pudding, &c., the pan D is made of a plain circular form, as represented in Fig. 3, and made of less diameter than the spider A, so as to leave a space all around the pan D for the passage of the steam. The pan D, when so constructed, is supported in the upper portion of the spider A by arms $i$ resting upon the flange $b$ and against the inner side of the spider, as shown in Fig. 3.

For the purpose of cooking meat, the pan D may be made in the form of a circular griddle or broiler.

K represents the cover, made in the form of an ordinary dish, basin, or pan, and of a size to fit within the offset or shoulder $c$ of the pan or spider A. $l$ is an elongated loop hinged to the cover K, so as to fit over the handle $a$ of the spider, as shown in Fig. 3. Upon raising the cover K it is supported by the loop $l$ upon the handle $a$ of the spider, as shown in Fig. 3.

The spider or pan A is filled with boiling water to a point not above the bottom of the pan D. The proper pan D, supplied with the articles intended to be cooked, is then placed within the pan or spider A, when the cover K is applied by slipping the loop $l$ over the handle $a$ of the spider. The steam emitted by the boiling water in the spider A passes through the openings in the pan D, or around the same, and, being prevented from escaping by the cover K, thoroughly cooks the articles contained in the pan D in a very short time, while the articles themselves are not brought in contact with the boiling water.

The spider A and pan D are preferably made of cast-iron, and the cover K of tin.

Either article may be used separately, in the ordinary manner, when it is not desired to use all of them conjointly, as above described.

The pan D being provided with an opening for inserting a lifter, it is more conveniently handled when used for baking articles in the oven.

We claim as our invention—

1. The combination, with the spider or pan A, provided with top flange $b$ and offset $c$, of the removable cover K and removable pan D, provided with lifter-opening $g$, substantially as and for the purpose set forth.

2. The combination, with the spider A, having a handle, $a$, of the cover K, provided with hinged loop $l$, sliding upon the handle $a$, substantially as and for the purpose set forth.

CHAS. G. SHEPARD.
PETER ADAMS, Jr.

Witnesses:
 EDWARD WILHELM,
 CHAS. J. BUCHHEIT.